United States Patent [19]

Hoogmartens et al.

[11] Patent Number: 5,532,328
[45] Date of Patent: Jul. 2, 1996

[54] PROCESS FOR THE PREPARATION OF A POLYMER

[75] Inventors: Ivan A. L. Hoogmartens, Wilrijk; Joannes M. J. V. Gelan, Genk; Dirk J. M. Vanderzande, Nieuwerkerken, all of Belgium; Peter E. Froehling, Sittard, Netherlands

[73] Assignee: DSM N.V., Heerlen, Netherlands

[21] Appl. No.: 307,837

[22] PCT Filed: Jan. 25, 1994

[86] PCT No.: PCT/NL94/00016

§ 371 Date: Dec. 15, 1994

§ 102(e) Date: Dec. 15, 1994

[87] PCT Pub. No.: WO94/17120

PCT Pub. Date: Aug. 4, 1994

[30] Foreign Application Priority Data

Jan. 29, 1993 [NL] Netherlands ............................ 9300094

[51] Int. Cl.$^6$ .............................. C08F 4/00; C08F 28/06; C08F 26/06; C08F 24/00; C08F 34/00
[52] U.S. Cl. .............. 526/193; 526/195; 526/222; 526/234; 526/256; 526/258; 526/270; 526/271; 526/262
[58] Field of Search ........................... 526/193, 195, 526/222, 234, 256, 258, 262, 270, 271

[56] References Cited

U.S. PATENT DOCUMENTS

| | | | |
|---|---|---|---|
| 3,336,378 | 8/1967 | Maier . | |
| 4,161,571 | 7/1979 | Yasui et al. | 526/90 |
| 4,640,748 | 2/1987 | Wudl et al. . | |
| 4,772,940 | 9/1988 | Wudl et al. . | |
| 4,795,242 | 1/1989 | Wudl et al. . | |
| 5,157,083 | 10/1992 | Aonuma et al. | 525/285 |
| 5,391,664 | 2/1995 | Takei et al. | 526/210 |
| 5,391,671 | 2/1995 | Tazaki et al. | 526/347 |

FOREIGN PATENT DOCUMENTS

| | | |
|---|---|---|
| A2-164974 | 12/1985 | European Pat. Off. . |
| 0399463 | 11/1990 | European Pat. Off. . |

*Primary Examiner*—Joseph L. Schofer
*Assistant Examiner*—Wu C. Cheng
*Attorney, Agent, or Firm*—Cushman Darby & Cushman

[57] ABSTRACT

The invention relates to a process for the preparation of a polymer from heterocyclic monomer units. The process according to the invention is characterized in that polymerization takes place in the presence of a sulphur-containing reagent.

It has been found that the process according to the invention can be used to prepare polymers that can readily be processed, either in solution or in the melt. It has further been found that the reaction time of the reaction that takes place is short, while also the efficiency of the reaction is good. In the process according to the invention use can be made of monomer units that are thermostable. Such monomer units are easy to synthesize and easy to keep.

18 Claims, No Drawings

1

PROCESS FOR THE PREPARATION OF A POLYMER

FIELD OF THE INVENTION

The invention relates to a process for the preparation of a polymer from a heterocyclic monomer.

BACKGROUND OF THE INVENTION

Such a process is known from EP-A-399,463. In the process disclosed therein a solution of a heterocyclic monomer is brought at a suitable temperature, after which the polymer is prepared in the presence of a suitable catalyst. The polymer formed is isolated from the reaction mixture using a centrifugation technique, following which the polymer is further purified by means of a precipitation technique.

A disadvantage of the process disclosed in EP-A- 399,463 is that the resulting polymer can hardly if at all be processed, both its thermal properties and the solubility properties being absolutely insufficient for this. In addition, the reaction times of the reactions that take place are very long, and the yields of these reactions very low. As a result, large-scale application of the process as described above is not economically viable. A further disadvantage is that the heterocyclic monomer units from which the polymer is prepared is hardly if at all thermostable, so that it can be kept only if the necessary precautions are taken.

SUMMARY AND OBJECTS OF THE INVENTION

It is the aim of the invention to provide a process for the preparation of polymers that does not have the above-mentioned disadvantages. The process according to the invention is characterized in that polymerization takes place in the presence of a sulphur-containing reagent.

It has been found that the process of the invention can be used to prepare polymers that are readily processed in solution. It has further been found that the reaction time of the reaction that takes place is short, while also the efficiency of the reaction is good. In the process according to the invention use is made of heterocyclic monomer units that are thermostable. Such monomer units are easy to synthesize and easy to keep.

DETAILED DESCRIPTION OF THE INVENTION

The present process provides an improved means for preparing a polymer from heterocyclic monomer units by conducting the polymerization in the presence of a sulphur-containing reagent.

The heterocyclic monomer units that can be used in the process according to the invention have a structure according to formula 1 or formula 2 of the formula sheet, where $R_1$ and $R_2$ are the same or different and are chosen from the group consisting of hydrocarbon, alkyl groups with 1–20 carbon atoms, aryl groups with 6–20 carbon atoms, alkaryl groups with 7–40 carbon atoms, aralkyl groups with 7–40 carbon atoms, alkoxy groups with 1–18 carbon atoms, —O(CH$_2$CH$_2$O)$_n$CH$_3$ with n=1–4 and halogens; or where $R_1$ and $R_2$ both form part of a closed ring structure; X=O or S; Y=O, S or N—R$_3$; R$_3$ is hydrogen, an alkyl group, an aryl group, an alkaryl group or an aralkyl group. Optionally, the ring structure is substituted with such substituents also on other places. Some specific examples of suitable monomer units are maleic anhydride, n-phenyl maleimide, maleimide, citraconic anhydride, succinic anhydride, γ-butyrolactone and glutaric anhydride.

Optionally, the heterocyclic monomer unit contains a second closed ring structure, for example as represented in the formulas 3 and 4 presented elsewhere herein. Some specific examples of such monomer units are phtalide, phthalic anhydride and phtalimide.

The above-mentioned second ring structure optionally contains atoms other than carbon atoms. Examples of such monomer units are represented in formula 5 to formula 15 inclusive, where Z=N or P, or in formula 16 to formula 19 inclusive, where X and Y are as defined above, and where Q=O, S or N—R$_3$; R$_3$ is hydrogen, an alkyl group, aryl group, alkaryl group or aralkyl group. It is also possible for Z to be replaced wholly or partly by O and/or S atoms, in which case the adjoining unsaturated bonds of course have disappeared. In the formula 5 through formula 19 inclusive $R_1$ and $R_2$ are as defined above. Optionally, the second ring structure is substituted with such substituents also on other places. For formula 5 to formula 19 inclusive, see the formula sheet. Some specific examples of suitable monomer units are 5-azophthalic anhydride, 3,4-pyridine dicarboxylic anhydride, 2,3-pyrazine dicarboxylic anhydride, 4-azophthalic anhydride, 4-azophthalide, 5-azophthalide, 6-azophthalide, 7-azophthalide, 4,7-diazophthalide, 4,6-diazophthalide, 5,7-diazophthalide, thieno[2,3-c]furan-6(4H)-on, 1H,3-H-thieno[3,4-c]furan-1-on, 2,3-thiophene dicarboxylic anhydride, 3,4-thiophene dicarboxylic anhydride, 4-methodoxy- 5-dodecyloxyphthalide and 4,5-pyrimidine dicarboxylic anhydride. Preferably, the monomer units are chosen from the group formed by maleic anhydride, phthalic anhydride, phthalide, phthalimide and 2,3-pyridine dicarboxylic anhydride.

Optionally, a mixture of various heterocyclic monomer units is applied. It is also possible instead of anhydrides or lactones to use the corresponding di-acids or hydroxy acids.

Preparation of the polymer usually takes place in the liquid phase. To this end the heterocyclic monomer units can for example be heated to a temperature above their melting point, It is also possible for the monomer units to be dissolved in a suitable solvent. The solvent is chosen, for example, from the group of aromatic compounds such as benzene, toluene, xylene and mesitylene, hydrocarbons such as pentane and heptane, ethers such as dioxane, diethyl ether, ethyl methyl ether, di(methoxyethyl)ether and tetrahydrofuran, ketones such as acetone, diethyl ketone, methyl ethyl ketone and methyl isobutyl ketone, alcohols such as methanol, ethanol, isopropanol and phenol, halogenated compounds such as CHCl$_3$, CH$_2$Cl$_2$ and carbon tetrachloride, esters such as ethyl formiate and ethyl acetate, and compounds such as CS$_2$, acetonitrile, nitromethane, dimethyl sulphoxide, dimethyl formamide, triethyl phosphate, dimethyl acetamide, pyridine and chinoline. It is also possible to use a mixture of several solvents.

The reagent used in the process according to the invention contains a sulphur-containing compound. The reagent for example contains a compound chosen from the group formed by sulphur, H$_2$S, Na$_2$S, diphosphorus pentasulphide, P$_4$S$_3$, P$_4$S$_4$, P$_4$S$_5$, P$_4$S$_6$, P$_4$S$_7$, P$_4$S$_9$, P$_4$S$_{10}$, H$_2$S$_2$, (Et$_2$Al$_2$)$_2$S, Al$_2$S$_3$, boron sulphide, o,o-diethyldithiophosphoric acid, 2,4-bis(4-methoxyphenyl)-1,3-dithia- 2,4-diphosphetane-2, 4-disulphide and derivatives thereof, and silicon disulphide.

Optionally, a mixture of various sulphur-containing compounds is used. Preferably, the sulphur-containing reagent contains phosphorus pentasulphide.

A method for the preparation of 2,4-bis(4-methoxyphenyl)- 1,3-dithia-2,4-diphosphetane-2,4-disulphide is described in Organic Syntheses 62, 1984, pp. 158–163. A method for the preparation of derivatives of this compound is described in U.S. Pat. No. 3,336,378.

The amount of sulphur-containing reagent that is used is such that at least an equimolar amount of sulphur is added, calculated relative to the amount (X+Y) in the heterocyclic monomer units according to

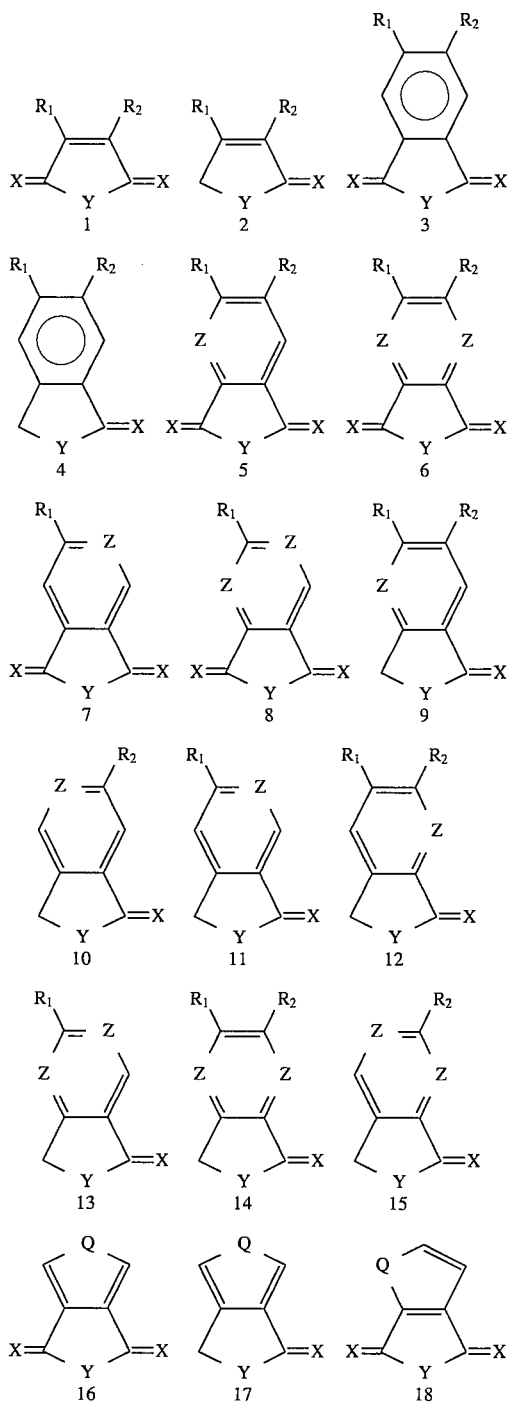

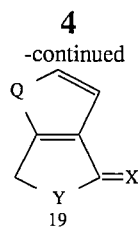

inclusive. Preferably, the molar ratio between added sulphur and (X+Y) is between 1 and 10, more preferably between 1 and 5. The reaction temperature is usually between 20° and 200° C., preferably between 100° and 200° C. The reaction time of the polymerization reaction is usually between 0.5 and 48 hours, preferably between 1 and 24 hours, more preferably between 1 and 5 hours. The pressure during the polymerization reaction is usually between 0.1 and 100 bar, preferably between 1 and 20 bar, more preferably between 1 and 10 bar.

To achieve optimum homogeneity in the distribution of the sulphur-containing reagent over the reaction mixture, the mixture is preferably mixed thoroughly, for example by stirring or by ultrasonic vibration. The process according to the invention yields polymers with the degree of polymerization varying within wide limits. The degree of polymerization is usually between 5 and 5000.

Through a suitable choice of the substituents $R_1$ and $R_2$, which one skilled in the art will be simply able to make, the polymer is made soluble in customary solvents. This makes it possible to process the polymer obtained in solution. Polymers containing one or more nitrogen atoms in the second ring-structure according to FIG. 5 to FIG. 9 inclusive, are advantageously solved in inorganic acids, for example sulphuric acid, hydro-chloric acid or phosphoric acid or in organic acids, for example p-toluene sulphonic acid, 10-campher sulphonic acid, 4-dodecylbenzene sulphonic acid or acid bis-alkyl phosphates, before processing. Solutions of such acids are also suitable.

The polymer obtained can also readily be mixed with one or more other polymers. Examples of suitable thermoplastic polymers are polyvinyl chloride or copolymers of vinyl chloride and other vinyl monomers, polyvinylidene fluoride or copolymers of polyvinylidene fluoride and other vinyl monomers, polystyrene or copolymers of vinyl aromatic monomers, for example styrene and p-methyl styrene, and other monomers, for example maleic anhydride, acrylonitrile and maleimide, poly(meth)acrylates or copolymers of a (meth)acrylate with other monomers, polyvinyl carbazole, polyolefins, for example polyethylene, ultrahigh molecular weight polyethylene (UHMWPE), polyisobutylene, polybutene, polymethyl pentene and polypropylene, polyvinyl acetate, polyvinyl alcohol, polyacrylonitrile, poly(meth)acryl esters, polyamides, polyesters, for example polyethylene terephthalate and polybutylene terephthalate, polycarbonates, polyether imides, polyvinyl (m)ethyl esters, polyvinyl isobutyl ethers, polyimides, polyethers, polysulphones, polyarylates, polyether sulphones, polyether esters, polyphenylene oxides, polyphenylene sulphides, polyester imides, polyether imides, polyurethanes, polyamide imides, poly (m)ethylene oxides, polybutadiene rubbers, polytetrafluoroethylene, acrylonitrile-butadiene-styrene copolymers, polyether-polyester block copolymers, liquid crystalline polymers, and the like.

The polymer obtained by the process according to the invention is generally electrically conducting.

The conducting properties of the electrically conducting polymer obtained can be brought at the desired level by means of an (oxidative or reductive) doping step, for which use can be made of the known doping techniques and reagents. These are mentioned, for example, in 'Handbook of conducting polymers' (T. A. Skotheim, Marcel Dekker Inc., N.Y., USA (1986).

The desired level of conducting properties is usually taken to mean that the conductance, measured by the so-called four-probe method, is at least $10^{-5}$ S/cm. This method is briefly described in EP-A-314311. A more detailed description can be found in H. H. Wieder, Laboratory Notes on Electrical and Galvanomagnetic Measurements, Elsevier, N.Y., 1979. This method is used to measure the specific conductivity:

$$\sigma = (L/A) * (1/R),$$

where
$\sigma$=specific conductivity (S/cm)
L=distance between the two inner electrodes [cm]
R=resistance [Ohm]
A=cross-sectional area [cm$^2$].

In specific cases the polymer obtained by the process according to the invention is more or less transparent to visible light (light transmitting). The transmittance, an effect also described by Wudl in Mol. Cryst. Liq. Cryst. 118 (1985), pp. 199–204, is measured by means of a spectroscopic technique according to ASTM standard E-409-81.

Optionally, additives are added to the polymer obtained, or to a mixture containing this polymer. Examples of such additives are impact modifiers, stabilizers, antioxidants, lubricants, fillers, colorants, pigments, flame retardants, reinforcing fibers and conducting fibers.

The invention will be elucidated on the basis of the following examples, without being limited thereto.

EXAMPLE I

A mixture of 2.75 g of phthalic anhydride (Aldrich), 5.65 g of diphosphorus pentasulphide (Aldrich) and 25 ml of xylene was heated for 21 hours at a temperature of 155° C. The precipitate formed was filtered off and subsequently washed with, successively, a 10% aqueous KOH solution, with water, and with boiling tetrahydrofuran. After drying, 1.3 g of polyisothianaphthene was obtained, which corresponds to an efficiency of 53%. After doping with iodine the product obtained had a specific conductivity of 1.3 S/cm.

EXAMPLE II

A mixture of 2.8 g of phthalide (Aldrich), 5.65 g of diphosphorus pentasulphide (Aldrich) and 25 ml of xylene was heated for 22 hours at a temperature of 145° C. The precipitate formed was filtered off and subsequently washed with, successively, a 10% aqueous KOH solution, with water, and with boiling tetrahydrofuran. After drying, 2.5 g of polyisothianaphthene was obtained, which corresponds to an efficiency of 90%. After doping with iodine the product obtained had a specific conductivity of 2.1 S/cm.

EXAMPLE III 4.96 g of phthalide (Janssen Chimica) was mixed with 11.2 g of diphosphorus pentasulphide and heated to a temperature of 120° C. while being stirred. During melting a violent reaction with gas development was observed. The reaction mixture was kept at 120° C. for an hour, following which it was cooled down to room temperature. The resulting solid product was washed with a 10% KOH solution and with water. Finally, the product was purified by means of Soxhlet extraction with chloroform and tetrahydrofuran. A black powder (polyisothianaphthene) was obtained (efficiency 80%).

EXAMPLE IV

Analogously to example III, 5.48 g of phthalic anhydride (Janssen Chimica) and 11.2 g of diphosphorus pentasulphide were mixed. After reaction and isolation, a black powder (polyisothianaphthene) was obtained (efficiency 80%).

EXAMPLE V

Analogously to example III, 1.0 g of 2,3-pyridine dicarboxylic anhydride and 2.0 g of diphosphorus pentasulphide were mixed. After reaction and isolation, a black powder (a nitrogen-substituted polyisothianaphthene) was obtained (efficiency 54%).

EXAMPLE VI

A mixture of 2,3-pyridine dicarboxylic anhydride, 10.0 g of phosphorus pentasulphide and 75 ml of xylene was heated for 20 hours at a temperature of 155° C. The precipitate formed was filtered off and twice boiled, each time for two hours, with 200 ml of methanol. This yielded polymer with an efficiency of 60%. The polymer was soluble in concentrated hydrochloric acid, in concentrated sulphuric acid and in a 0.25 M solution of camphorsulphonic acid in chloroform. After dedoping with hydrazine the polymer had a conductivity of $10^{-9}$ S.cm$^{-1}$. Doping with iodine increased the conductivity to $10^{-5}$ S.cm$^{-1}$. The transmittance of the undoped polymer was 23%. After doping with NOBF$_4$ the transmittance, relative to that of a blank sample, was 70%.

EXAMPLE VII

A mixture of 4.98 of pyrazine dicarboxylic anhydride, 9.95 g of phosphorus pentasulphide and 50 ml of xylene was heated for 20 hours to 160° C. The product was filtered off and boiled for three hours with 100 ml of methanol, and subsequently extracted with tetrahydrofuran in a Soxhlet apparatus. Polymer was obtained with an efficiency of 60%. The polymer was soluble in concentrated hydrochloric acid and in concentrated sulphuric acid. After doping with iron (III) chloride the polymer had a conductivity of $2.10^{-4}$ S.cm$^{-1}$.

EXAMPLE VIII

The reaction of Example I was repeated. The product was purified by boiling the filtered polymer with methanol. After dedoping with hydrazine the polymer had a conductivity of $3.10^{-4}$ S.cm$^{-1}$ and a transmittance of 16% at 480 nm. Doping of this polymer with NOSbF$_6$ yielded a product having a conductivity of 0.2 S.cm$^{-1}$ and a transmittance of 60%.

EXAMPLE IX 5.68 g of phthalic acid, 13,92 g of phosphorus pentasulphide and 50 ml of xylene were heated to 160° C. for 20 hours. The product was filtered and boiled for four hours with 100 ml of methanol. The polymer obtained (30% efficiency) had a conductivity of 0.11 S.cm$^{-1}$.

We claim:
1. A process for the preparation of a polymer which consists essentially of heterocyclic monomer units by polymerizing at least one heterocyclic monomer in the presence of an effective amount of a sulphur-containing reagent whereby said polymer is obtained, wherein said heterocyclic monomer is selected from the group consisting of

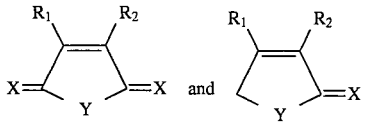

wherein $R_1$ and $R_2$ are the same or different and are selected from the group consisting of hydrogen, alkyl groups having 1–20 carbon atoms, aryl groups having 6–20 carbon atoms, alkaryl groups having 7–40 carbons atoms, aralkyl groups having 7–40 carbon atoms, alkoxy groups having 1–18 carbon atoms, —O(CH$_2$CH$_2$O)$_n$CH$_3$ wherein n is 1–4, and a halogen; or where $R_1$ and $R_2$ both form part of a closed ring structure; X is O or S; and Y is O, S, or NH.

2. A process according to claim 1, wherein the reagent contains a compound selected from the group consisting of sulphur, H$_2$S, Na$_2$S, diphosphorus pentasulphide, P$_4$S$_3$, P$_4$S$_4$, P$_4$S$_5$, P$_4$S$_6$, P$_4$S$_7$, P$_4$S$_9$, P$_4$S$_{10}$, H$_2$S$_2$, (Et$_2$Al$_2$)$_2$S, Al$_2$S$_3$, dithiophosphoric acid, 2,4-bis(4-methoxyphenyl)-1,3-dithia-2,4-diphosphetane-2,4-disulphide and derivatives thereof, and silicon disulphide.

3. A process according to claim 1 or 2, wherein the reagent contains diphosphorus pentasulphide.

4. A process according to claim 1 or 2, wherein said heterocyclic monomer is selected from the group consisting of maleic anhydride, n-phenyl maleimide, maleimide, citraconic anhydride, succinic anhydride, γ-butyrolactone and glutaric anhydride.

5. A process according to claim 1, wherein the polymerization reaction takes place at a temperature between 20° and 200° C.

6. A process according to claim 1, wherein the polymerization reaction takes place during 0.5–48 hours.

7. A process according to claim 1, wherein the reaction is conducted under a pressure of between 0.1 and 100 bar.

8. A polymer composition containing the polymer obtained according to claim 1 and another polymer.

9. A process for the preparation of a polymer based on at least one heterocyclic monomer comprising polymerizing at least one heterocyclic monomer in the presence of an effective amount of a sulphur-containing reagent, wherein said heterocyclic monomer is selected from the group consisting of:

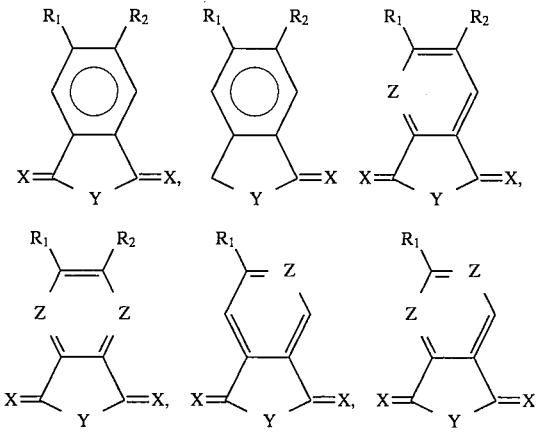

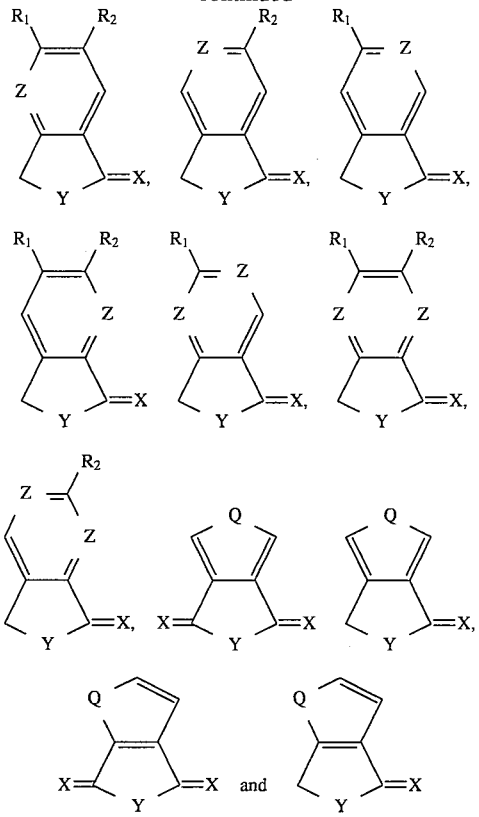

wherein $R_1$ and $R_2$ are the same or different and are selected from the group consisting of hydrogen, alkyl groups having 1–20 carbon atoms, aryl groups having 6–20 carbon atoms, alkaryl groups having 7–40 carbon atoms, aralkyl groups having 7–40 carbon atoms, alkoxy groups having 1–18 carbon atoms, —O(CH$_2$CH$_2$O)$_n$CH$_3$ wherein n is 1–4, and a halogen; or where $R_1$ and $R_2$ both form part of a closed ring structure; X is O or S; and Y is O, S or NH, Z represents nitrogen or phosphorous, and Q represents oxygen, sulfur, or NH, wherein a polymer based on heterocyclic units is obtained.

10. A process according to claim 9, wherein the heterocyclic monomer is selected from the group consisting of phthalide, phthalic anhydride and phthalimide.

11. A process according to claim 9 or 10, wherein the reagent contains a compound selected from the group consisting of sulphur, H$_2$S, Na$_2$S, diphosphorus pentasulphide, P$_4$S$_3$, P$_4$S$_4$, P$_4$S$_5$, P$_4$S$_6$, P$_4$S$_7$, P$_4$S$_9$, P$_4$S$_{10}$, H$_2$S$_2$, (Et$_2$Al$_2$)$_2$S, Al$_2$S$_3$, boron sulphide, o,o-diethyl-dithiophosphoric acid, 2,4-bis(4-methoxyphenyl)-1,3-dithia-2,4-diphosphetane-2,4-disulphide and derivatives thereof, and silicon disulphide.

12. A process according to claim 9 or 10, wherein the reagent contains diphosphorus pentasulphide.

13. A process according to claim 9, wherein the polymerization reaction takes place at a temperature between 20° and 200° C.

14. A process according to claim 9, wherein the polymerization reaction takes place during 0.5–48 hours.

15. A process according to claim 1, wherein the reaction is conducted under a pressure of between 0.1 and 100 bar.

16. A process according to claim 9, wherein said heterocyclic monomer has two heterocyclic rings.

17. A polymer composition, containing the polymer obtained according to claim 9 and another polymer.

18. A process for the preparation of a polymer comprising polymerizing at least one heterocyclic monomer in the presence of an effective amount of a sulphur-containing reagent, wherein said heterocyclic monomer is selected from the group consisting of 5-azophthalic anhydride, 3,4-pyridine dicarboxylic anhydride, 2,3-pyrazine dicarboxylic anhydride, 4-azophthalic anhydride, 4-azophthalide, 5-azophthalide, 6-azophthalide, 7-azophthalide, 4,7-diazophthalide, 4,6-diazophthalide, 5,7-diazophthalide, thieno[2,3-c]furan- 6(4H)-on, 1H,3H-thieno[3,4-c]furan-1-on, 2,3-thiophene dicarboxylic anhydride, 3,4-thiophene dicarboxylic anhydride and 4,5-pyrimidine dicarboxylic anhydride.

* * * * *